United States Patent
Nguyen et al.

(10) Patent No.: US 9,632,803 B2
(45) Date of Patent: Apr. 25, 2017

(54) MANAGING CONFIGURATION STATES IN AN APPLICATION SERVER

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 187 days.

(21) Appl. No.: 14/097,668

(22) Filed: Dec. 5, 2013

(65) Prior Publication Data

US 2015/0160952 A1    Jun. 11, 2015

(51) Int. Cl.
  *G06F 9/44*    (2006.01)
  *G06F 9/445*   (2006.01)
  *G06F 11/14*   (2006.01)
  *G11B 27/10*   (2006.01)

(52) U.S. Cl.
  CPC ...... *G06F 9/44505* (2013.01); *G06F 11/1469* (2013.01); *G11B 27/105* (2013.01)

(58) Field of Classification Search
  CPC .... G06F 12/0888; G06F 3/0608; G06F 3/061; G06F 9/4401; G06F 9/4411; G06F 3/0613; G06F 17/30902; G06F 11/1469; G06F 17/30247; G06F 9/44505; G11B 27/105
  USPC .......................................................... 713/1
  See application file for complete search history.

(56) References Cited

U.S. PATENT DOCUMENTS

| 6,098,093 | A  |   | 8/2000  | Bayeh et al.    |            |
|-----------|----|---|---------|-----------------|------------|
| 6,360,331 | B2 |   | 3/2002  | Vert et al.     |            |
| 6,785,805 | B1 | * | 8/2004  | House et al.    | 713/1      |
| 6,820,085 | B2 |   | 11/2004 | Nishizawa et al.|            |
| 7,322,010 | B1 | * | 1/2008  | Mikula          | G06F 11/1469 715/734 |
| 7,613,827 | B2 |   | 11/2009 | Bruck et al.    |            |
| 8,261,246 | B1 | * | 9/2012  | Naroff          | G06F 8/71 717/106 |
| 8,786,753 | B2 | * | 7/2014  | Sassa           | G06F 17/30247 348/222.1 |
| 2004/0030689 | A1 | * | 2/2004  | Anderson     | G06F 17/3061 |
| 2006/0212662 | A1 | * | 9/2006  | Ueda         | 711/147     |
| 2006/0277295 | A1 | * | 12/2006 | Masuda et al.| 709/224     |
| 2007/0013790 | A1 | * | 1/2007  | Nakase       | H04N 5/772 348/231.99 |

(Continued)

OTHER PUBLICATIONS

Christodoulopoulou, Rosalia et al., "Fast and Transparent Recovery for Continuous Availability of Cluster-based Servers," Proceedings of the eleventh ACM SIGPLAN symposium on Principles and practice of parallel programming (pp. 221-229) Mar. 29-31, 2006, University of Toronto, Canada, http://dl.acm.org/citation.cfm?id=1123005.

(Continued)

*Primary Examiner* — Thomas Lee
*Assistant Examiner* — Santosh R Poudel
(74) *Attorney, Agent, or Firm* — Lowenstein Sandler LLP

(57) ABSTRACT

A mechanism for managing configuration states in an application server. The method includes saving a plurality of configuration states of an application server. The method also includes selecting a configuration state from the plurality of configuration states in view of a a match of one of a file tuple or a database tuple between the selected configuration state and the plurality of configuration states and data quantity associated with the plurality of configuration states.

20 Claims, 6 Drawing Sheets

(56) References Cited

U.S. PATENT DOCUMENTS

| | | | |
|---|---|---|---|
| 2007/0130480 A1* | 6/2007 | Hill et al. ..................... 713/300 |
| 2007/0233714 A1* | 10/2007 | Tsuchiya ............ G06F 3/04817 |
| 2008/0077569 A1* | 3/2008 | Lee et al. .......................... 707/5 |
| 2008/0126831 A1 | 5/2008 | Downey et al. |
| 2008/0205775 A1* | 8/2008 | Brinker et al. ............... 382/225 |
| 2009/0249055 A1* | 10/2009 | Itoh .................................. 713/2 |
| 2010/0011198 A1* | 1/2010 | Hooker et al. ..................... 713/1 |
| 2010/0114920 A1* | 5/2010 | Srivastava .......... G06F 21/6254 707/757 |
| 2010/0218184 A1* | 8/2010 | Minematsu et al. .............. 718/1 |
| 2011/0023026 A1* | 1/2011 | Oza .................................. 718/1 |
| 2011/0115943 A1* | 5/2011 | Sassa ............... G06F 17/30247 348/231.5 |
| 2011/0116726 A1* | 5/2011 | Hosaka .................. G06T 5/003 382/255 |
| 2011/0145489 A1* | 6/2011 | Yu ........................ G06F 3/0613 711/103 |
| 2011/0167419 A1* | 7/2011 | Ishikawa ...................... 717/171 |
| 2011/0173303 A1* | 7/2011 | Rider ............................ 709/220 |
| 2012/0089666 A1* | 4/2012 | Goswami et al. ............ 709/203 |
| 2012/0131320 A1* | 5/2012 | Park ....................... G06F 9/4401 713/2 |
| 2012/0254444 A1 | 10/2012 | Harchol-Balter et al. |
| 2013/0111468 A1* | 5/2013 | Davis et al. ....................... 718/1 |
| 2013/0198148 A1* | 8/2013 | Chambliss ........ G06F 17/30156 707/692 |
| 2014/0032539 A1* | 1/2014 | Potok ................ G06F 17/30011 707/723 |
| 2014/0164449 A1* | 6/2014 | Kim et al. .................... 707/827 |

OTHER PUBLICATIONS

Laadan, Oren et al., "Transparent Checkpoint-Restart of Distributed Applications on Commodity Clusters," Cluster Computing, 2005, IEEE International, 13 pages, http://ieeexplore.ieee.org/xpl/login.jsp?tp=&arnumber=4154082&url=http%3A%2F%2Fieeexplore.ieee.org%2Fxpls%2Fabs_all.jsp%3Farnumber=4154082.

Lodi, G. et al. "SLA-Driven Clustering of QoS-Aware Application Servers," IEEE Transactions of Software Engineering, vol. 33, No. 3, Mar. 2007 pp. 186-197, http://ieeexplore.ieee.org/xpl/login.jsp?tp=&arnumber=4084136&url=http%3A%2F%2Fieeexplore.ieee.org%2Fxpls%2Fabs_all.jsp%3Farnumber=4084136.

Miller, Andrig, "Performance Tuning Guide for use with JBoss Enterprise Application Platform 5.2.x," 2012, Red Hat, Inc., 76 pages, https://access.redhat.com/site/documentation/en-US/JBoss_Enterprise_Application_Platform/5/pdf/Performance_Tuning_Guide/JBoss_Enterprise_Application_Platform-5-Performance_Tuning_Guide-en-US.pdf.

"What Happens When a Master Node Goes Down", http://docs.splunk.com/Documentation/Splunk/5.0.4/Indexer/Whathappenswhenamasternodegoesdown, 200-201.

* cited by examiner

MANAGING CONFIGURATION STATES IN AN APPLICATION SERVER

TECHNICAL FIELD

The embodiments of the disclosure relate generally to a computer system and, more specifically, relate to managing configuration states in an application server.

BACKGROUND

Today, typical application servers, including data federation servers, have many different services deployed. Such services include, but are not limited to, data federation views, queues, web services and data sources. All of these services use storage spaces such as caches, buffers, and files on disk to store and retrieve original data. In general, these storage spaces maintain complicated states of environment, which makes it difficult to predict server settings and deployment in one concrete environment. Additionally, after many queries processed by the server over time, these storage spaces fill up with data that is not usable for current tasks to be executed by the application servers. As such, these storage spaces not only consume substantial memory, but also slow down processing by the application servers.

Current art utilizes file versioning systems to overcome the challenge of substantial memory in the storage space. File versioning systems allow data, such as computer files, to exist in several versions at the same time. File versioning systems, however, do not allow for versions of a file to be hosted on different servers. In addition, the file versioning occurs only when the file changes and automatically selects the current version of the file to be sent to the application server.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure are directed to managing configuration states in an application server. A configuration state may include initial settings of the application server that are frequently used and do not change from one user to another. A configuration state can be stored in a data repository in the application server. A data repository may include, but is not limited to, temporary files, work files, database states (records of database used as working data), data buffers and data caches.

A method of one embodiment includes saving a plurality of configuration states of an application server. The method also includes selecting a configuration state from the plurality of saved configuration states in view of a similarity between the selected configuration state and the plurality of saved configuration states and a data quantity associated with the plurality of configuration states.

Prior solutions for managing configuration states in an application server present several disadvantages. One solution is a file versioning system. The file versioning system allows for data, such as computer files, to exist in several versions at the same time. However, the file versioning system does not allow for versions of data to be hosted on different servers. In addition, the file versioning provided by a file versioning system is only performed when the file changes and automatically selects the current version of the file to be sent to the application server. Embodiments of the disclosure overcome these disadvantages by saving a plurality of configurations states of different application servers during a specific period. A configuration state is then selected from the plurality of configuration states for loading into the application server based on a similarity between the plurality of configuration states and quantity of data stored in each of the plurality of the configuration states.

Figure 1A:
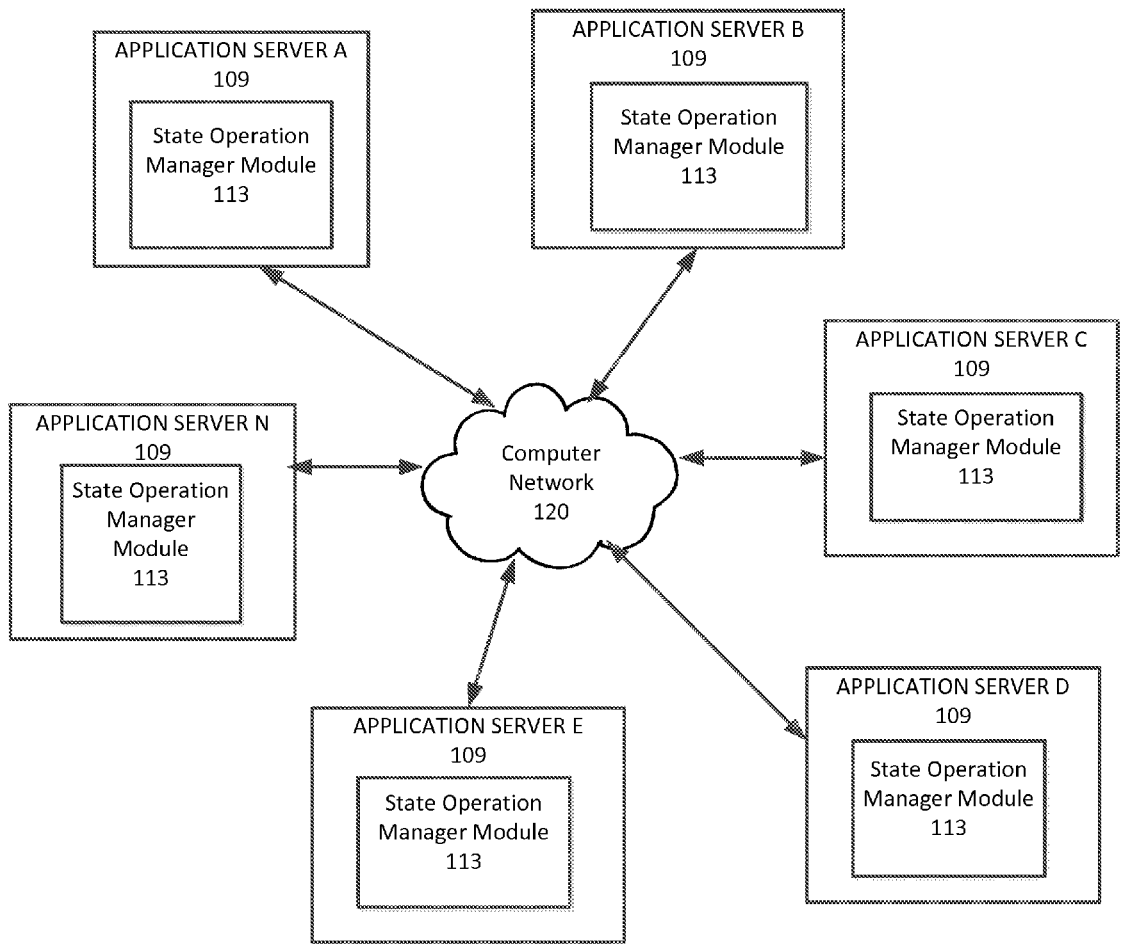
FIG. 1A is a block diagram that illustrates a network architecture in which embodiments of the disclosure may operate.

FIG. 1A is a block diagram that illustrates a network architecture 101 in which embodiments of the disclosure may operate. Network architecture 101 includes a plurality of application servers 109 that communicate over a network 120. Network 120 may be any type of communication network including, but not limited to, a local area network (LAN), a wide area network (WAN) (e.g., the Internet,) or similar communications network. The network 120 can include any number of network devices and computing devices that are in communication over any combination of wired and wireless communication lines.

In one embodiment, each of the application servers 109 may hosts a state operation manager module 113. In one embodiment, the application server includes one or more configuration states. A configuration state is a data repository in the application server, which includes initial settings of the application server that are frequently used and do not change from one user to another.

In one embodiment, the state operation manager module 113 functions to manage the configuration states of the plurality of application servers 109. In one embodiment, the state operation manager module 113 saves a set of the configuration states from the AS 109. In one embodiment, the state operation manager module 113 saves the set of configuration states during a time interval. The time interval may include one or more of minutes, hours, days, weeks etc.

In one embodiment, the state operation manager module 113 determines similarities between the saved configuration states of the application servers 109. In one embodiment, the state operation manager module 113 groups the configuration states based on the similarities. In one embodiment, the state operation manager module 113 selects a configuration state as a representative configuration state among the group of the configuration states. In one embodiment, the state operation manager module 113 selects the configuration state as the representative configuration state based on quantity of the data of the configuration states in the group. In one embodiment, the state operation manger module 113 loads the representative state into the application server 109.

Figure 1B:
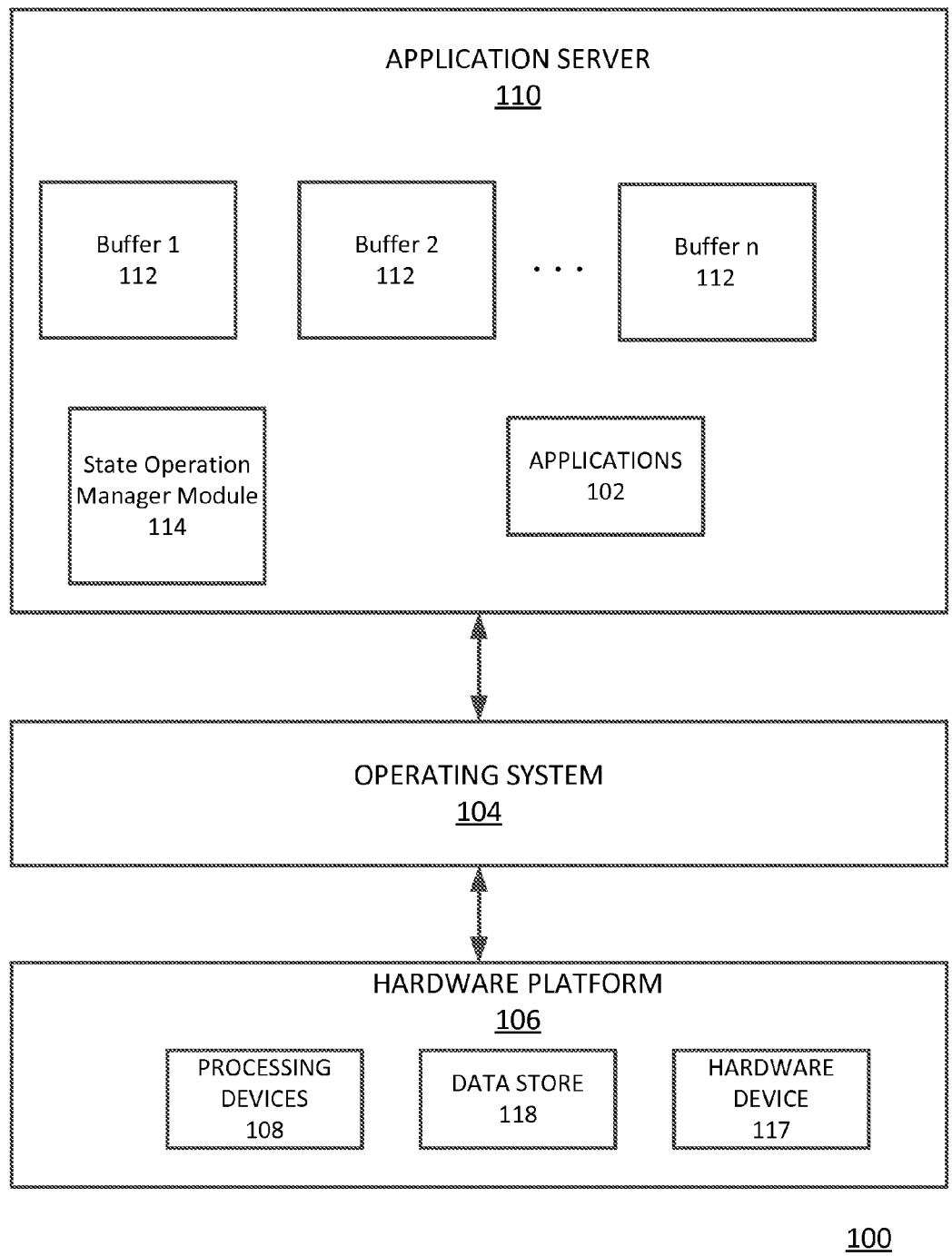
FIG. 1B is a block diagram of a computer system in which the embodiments of the present disclosure may operate.

In one embodiment, the state operation manager module 113 receives information associated with the saved configuration state that has malfunctioned. In one embodiment, the state operation manager module 113 searches the group that includes one or more configuration states similar to the malfunctioned configuration state. In one embodiment, the state operation manager module 113 removes the malfunctioned configuration state from the group. In one embodiment, the state operation manager module 113 removes the malfunctioned configuration state and one or more configuration states that are similar to the malfunctioned configuration state in the group. FIG. 1B is a block diagram illustrating a computer system 100 in which embodiments of the present invention may be implemented. In one embodiment, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a mainframe server device or any other type of server device. The computer system 100 comprises an application server (AS) 110, a hardware platform 106, on top of which runs an operating system (OS) 104. In one embodiment, the AS 110 is same the application server 109 described with respect to FIG. 1A. The OS 104 may include Microsoft™, Linux™, Solaris™, Mac™ OS or any other suitable OS for managing operations on the computer system 100.

The hardware platform 106 may include one or more processing devices 108 and a data store 118. In one embodiment, the data store 118 comprises one or more hardware or software devices, which may be located internally or externally to the computer system 100. Examples of data store 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., PDS, DVD, BlueRay drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

The AS 110 is a server that provides services to execute enterprise applications. In one embodiment, the AS 110 is a data federation server. The AS 110 may include one or more software application programs 102 (i.e. applications). The applications 102 may be any computer-executable program capable of communicating with the AS 110. Some of these applications may include, but are not limited to, web applications, Microsoft™ applications, an Eclipse integrated development environment (IDE), and/or other applications.

A unique identifier is assigned to the AS 110. In one embodiment, the AS 110 is cluster of servers, each of which provides redundant backup information to another AS 110 in the cluster. As such, if an AS server 110 in the cluster fails and/or malfunctions, another AS server 110 in the cluster automatically takes over for the failed server AS 110.

In one embodiment, the AS 110 includes one or more configuration states. A configuration state is a data repository in the application server, which includes initial settings of the application server that are frequently used and do not change from one user to another. A configuration state can be stored in a data repository in the application server. A data repository may include, but is not limited to, temporary files, work files, database states (records of database used as working data), data buffers and data caches.

In one embodiment, each of the configuration states include a file tuple. A file tuple is a list of ordered set of values having different types of data. As an example, a file tuple may include a filePath and a fileContent, where filePath is a name of a file or directory and fileContent is content stored in the file or directory. In one embodiment, each of the configuration states include database tuples. A database tuple is a data entity composed of subject-predicate-object. The database tuples may be stored as a row in a table. As an example, a database tuple may include cString, tableID and row, where cString is connection string to the database, tableID is a qualified name of the table, and row is a list of concrete items in the row. The format may be a combination of file tuples and database tuples.

The AS 110 may also include a plurality of buffers 112. A buffer is a storage area for temporarily storing data. The buffer 112 may be an abstract memory storage such as a virtual file system. The buffer 112 may be a physical memory storage such as a disk. implemented into the computer system. The buffer 112 may be a combination of abstract and physical storage.

Referring back to FIG. 1B, the AS 110 may also include a state operation manager (SOM) module 114 to manage the configuration states of the plurality of AS 110. The SOM module 114 is same as the state operation manager module 113 of FIG. 1A. In one embodiment, the SOM module 114 assigns each of the configuration states with a date and time of saving the configuration state. The date and time may be during the the time interval. As discussed above, the time interval may include one or more of minutes, hours, days, weeks etc. In one embodiment, the SOM module 114 labels the configuration state with the unique identifier of the AS 110.

In one embodiment, the SOM module 114 saves a set of the configuration states from the AS 110 into the buffers 112. In one embodiment, each of the buffers 112 is associated with a time interval during which SOM module 114 saves the configuration states into the buffer 112.

In one embodiment, the SOM module 114 selects which buffer 112 to save the configuration states. The buffer 112 may be selected based on the date and time assigned to each of the configuration states. In one embodiment, the SOM module 114 saves the configuration state having the corresponding date and time falling in the time interval associated with the buffer 112. As an example, there are 21 buffers in a week and a configuration state is associated with only one of the 21 buffers. For example, Buffer1 112 corresponds to a time interval starting from Monday @ 12 pm and ending on the Monday @ 8 am. As such, all the configuration states that were collected in this time interval will be saved in the Buffer1 112.

In one embodiment, the SOM module 114 determines whether there are similarities between the configuration states saved in the buffer 112 during the time interval. In one embodiment, the similarities are determined by comparing the file tuples in each of the configuration states with one another. In one embodiment, the similarities are determined by comparing the database triples stored in database rows in the configuration states with one another. In one embodiment, the SOM module 114 sorts the configuration states in a group in each of the buffers 112 when there are similarities between the configuration states. In one embodiment, the group in each of the buffers 112 is a single group. The configuration states are grouped based on a threshold value, which may include a specific number of matches in the similarities between the configuration states.

In one embodiment, the SOM module 114 compares a quantity of data stored in each of the configuration states of the group in the buffer 112. In one embodiment, at a pre-determined time, the SOM module 114 selects a configuration state as a representative configuration state for the buffer 112 among the group of the configuration states. The pre-determined time occurs after the time interval. The representative configuration state may be selected based on the quantity of the data of the configuration states in the group, as described further below.

In one embodiment, the configuration state with the largest quantity of data among the configuration states in the group is selected as the representative configuration state. As discussed above, the data of the configuration state is stored in one of file tuples format, database tuples format or combination of both. As an example, the representative configuration state may include the file tuples having the size to be largest among the configuration states in the group. In another example, the representative configuration state may include the database tuples having the size to be largest among the configuration states in the group. In a further example, the representative configuration state may include both the size of the file tuples and the database tuples to be largest among the configuration states in the group.

In one embodiment, the SOM module 114 may load the representative configuration state into the AS 110. The representative configuration state may be loaded at the pre-determined time. The AS 110 into which the representative configuration state is loaded is determined based on the unique identifier of the AS 110 assigned to the representative configuration state.

In one embodiment, the SOM module 114 receives information associated with the configuration state that has malfunctioned. The information may include a time of the malfunction of the configuration state and the unique identifier associated with the AS 110. In one embodiment, the malfunctioned configuration state is saved in the group in the buffer 112. In one embodiment, the SOM module 114 may receive the information from a client. The client may be a user of the computer system 100. The client may be another device communicably coupled to the computer system 100.

In one embodiment, the SOM module 114 searches the group in the buffer 112 that may include one or more configuration states that are similar to the malfunctioned configuration state saved in the same group in the buffer 112. In one embodiment, malfunctioned configuration state is compared to the one or more configuration states of the group in the buffer 112 to determine whether the similarities between the malfunctioned configuration state and the one or more configuration states reach the threshold value. As discussed above, the threshold value may include a specific number of matches in the similarities between the configuration states. The SOM module 114 marks the configuration states of the group in the buffer 112 as malfunctioned configuration states when the similarities reach the threshold value. In one embodiment, the SOM module 114 removes the malfunctioned configuration state and the marked configuration states from the buffer 112. In one embodiment when the similarities do not reach the threshold value, then it is determined that there are no configuration states of the group in the buffer 112 that match with the malfunctioned configuration state of the group in the buffer 112. In one embodiment, the SOM module only removes the malfunctioned configuration state from the buffer 112.

Figure 2A:
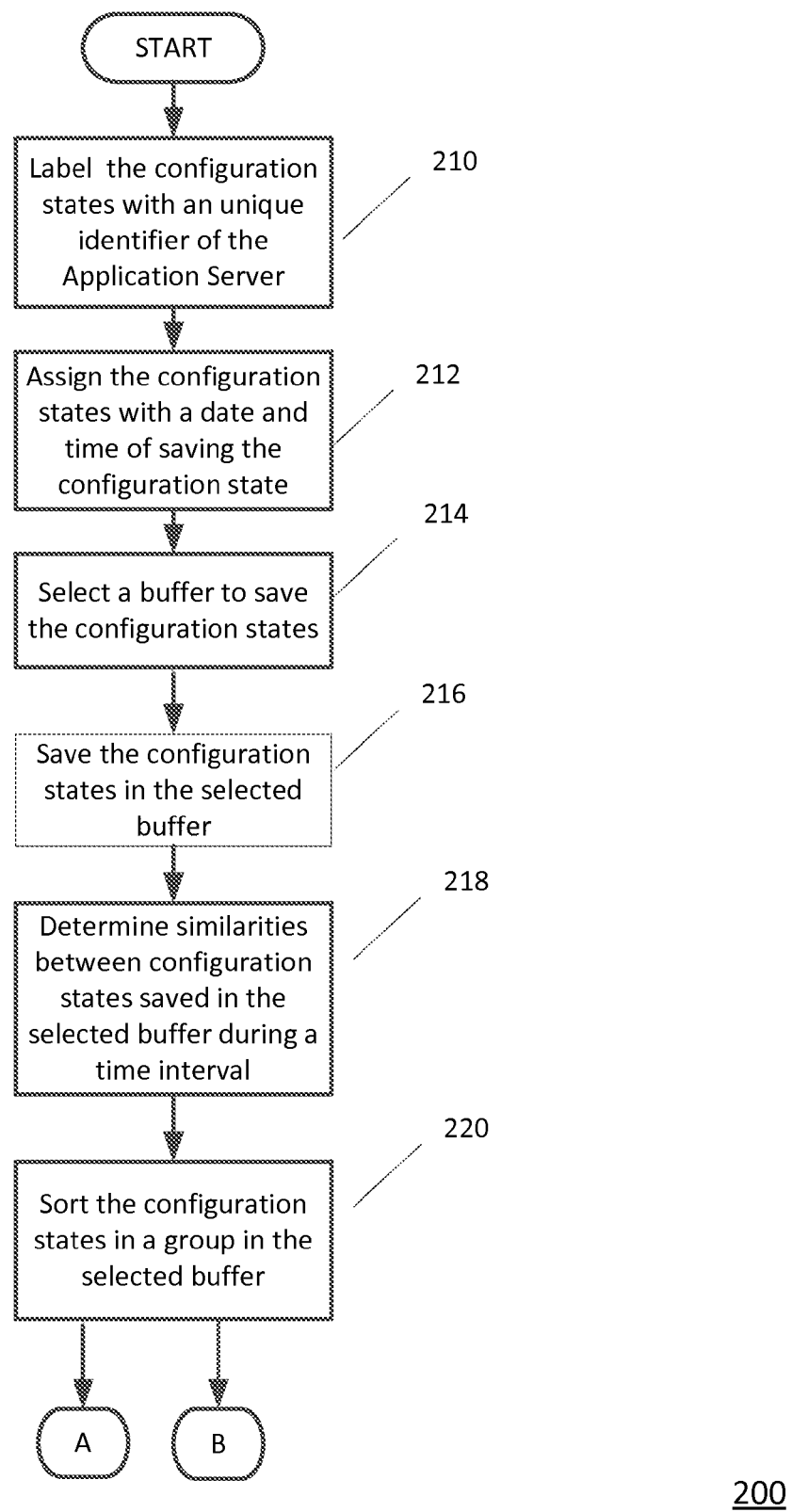
FIGS. 2A, 2B and 2C illustrate a flow diagram of one embodiment of a method for managing configuration states in an application server.
Figure 2B:
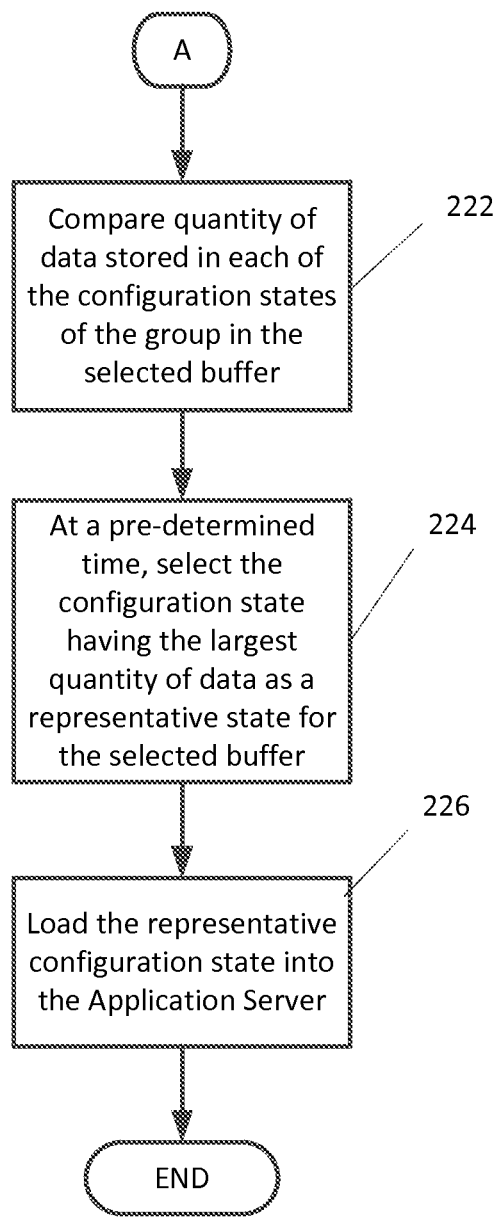
Figure 2C:
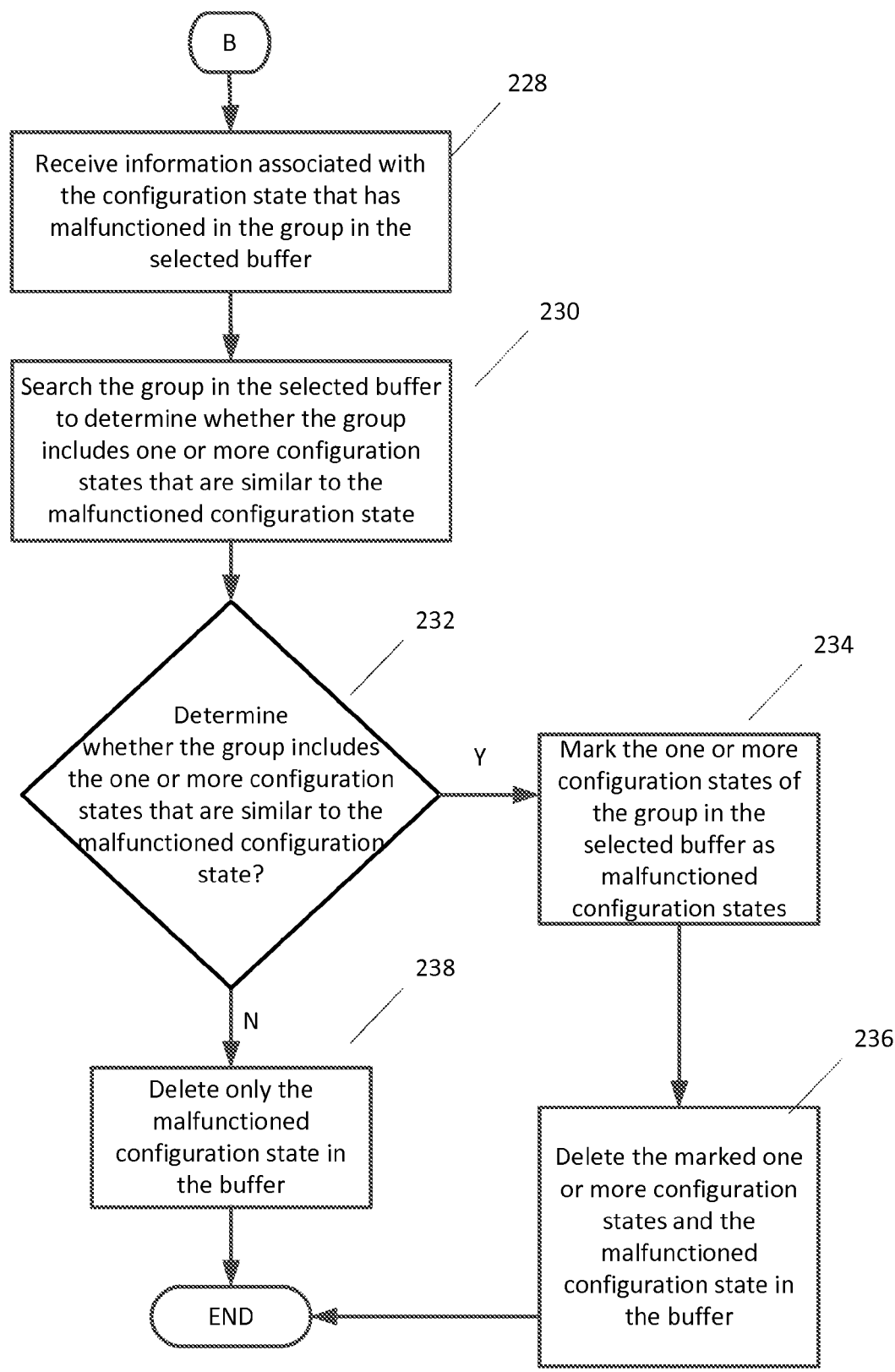

FIGS. 2A, 2B and 2C are flow diagrams illustrating a method 200 for managing configuration states in an application serve according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the state operation manager (SOM) module 114 of FIG. 1 executing in a computing device, such as the computer system 100 of FIG. 1.

Referring to FIG. 2A, method 200 begins at block 210 where the SOM module 114 labels the pluralities of configurations states of the AS 110 with a unique identifier of the AS 110. As discussed above, the unique identifier is associated with the AS 110 corresponding to the configuration state. Also as discussed above, a configuration state is a data repository in the application server, which includes initial settings of the application server that are frequently used and do not change from one user to another. Such data repository includes but is not limited to temporary files, work files, database states (records of database used as working data), data buffers and data caches. At block 212, the SOM module 114 assigns the configuration state with a date and a time of saving the configuration state. In one embodiment, the configuration states are saved during a time interval. As such, the date and time of saving the configuration state falls in the time interval. As discussed above, the time interval may include one or more of minutes, hours, days, weeks etc.

At block 214, the SOM module 114 selects the buffer 112 to save the configuration states. As discussed above, the buffer 112 is a storage area for temporarily storing data. Also, as discussed above, the buffer 112 is associated with the time interval during which configuration states are saved to the buffer 112. In one embodiment, the buffer 112 is selected based on the date and time assigned to each of the configuration states. In one embodiment, the SOM module 114 saves the configuration state having the corresponding date and time falling in the time interval associated with the buffer 112. At block 216, the SOM module 114 saves the configuration states in the selected buffer 112.

At block 218, the SOM module 114 determines similarities between the configuration states saved in the selected buffer 112 during the time interval. As discussed above, the time interval may include one or more of minutes, hours, days, weeks etc. In one embodiment, the similarities are determined by comparing the file tuples in each of the configuration states with one another. In one embodiment, the similarities are determined by comparing the database triples stored in database rows in the configuration states with one another. [T.] At block 220, the SOM module 114 sorts the configuration states in a group in the selected buffer 112 based on the similarities. In one embodiment, the configuration states are grouped based on a threshold value, which includes a specific number of matches in the similarities between the configuration states.

Referring to FIG. 2B, the method begins at block 222, where the SOM module 114 compares the quantity of data stored in each of the configuration states in the group in the selected buffer 112. At block 224, at a pre-determined time, the SOM module 114, selects the configuration state having the largest quantity of data as a representative configuration state for the selected buffer 112. As discussed above, the pre-determined time is after the time interval. Also, as discussed above, the data of the configuration state is stored in one of file tuples format, database tuples format or combination of both. At block 226, the SOM module 114 loads the representative configuration state into the AS 110. Also, as discussed above, the AS 110 into which the representative configuration state is loaded is determined based on the unique identifier of the AS 110 assigned to the representative configuration state Referring to FIG. 2C, the method begins at block 228, where SOM module 114 receives information associated with the configuration state that has malfunctioned in the group in the selected buffer 112. The information may include a time at which configuration state malfunctioned and the unique identifier associated with the AS 110. At block 230, the SOM module 114 searches the group in the selected buffer 112, to determine whether the group includes one or more configuration states that is similar to the malfunctioned configuration state saved in the same group. In one embodiment, malfunctioned configuration state is compared to the one or more configuration states of the group in the buffer 112 to determine whether the similarities between the malfunctioned configuration state and the one or more configuration states reach the threshold value. As discussed above, the threshold value may include a specific number of matches in the similarities between the configuration states. At block 232, a decision is made to determine whether the group includes the one or more configuration states similar to the malfunctioned configuration state. At block 234 the SOM module 114 marks the one or more configuration states of the group in the buffer 112 as a malfunctioned configuration states when it is determined at block 234 that the group includes the one or more configuration states that are similar to the malfunctioned state. At block 236, the SOM 114 deletes the marked configuration states and the malfunctioned configuration state in the buffer 112. At block 238, the SOM module 114 only deletes the malfunctioned configuration state in the buffer 112 when it is determined at block 232 that the group does not includes the one or more configuration states that are similar to the malfunctioned configuration state.

Figure 3:
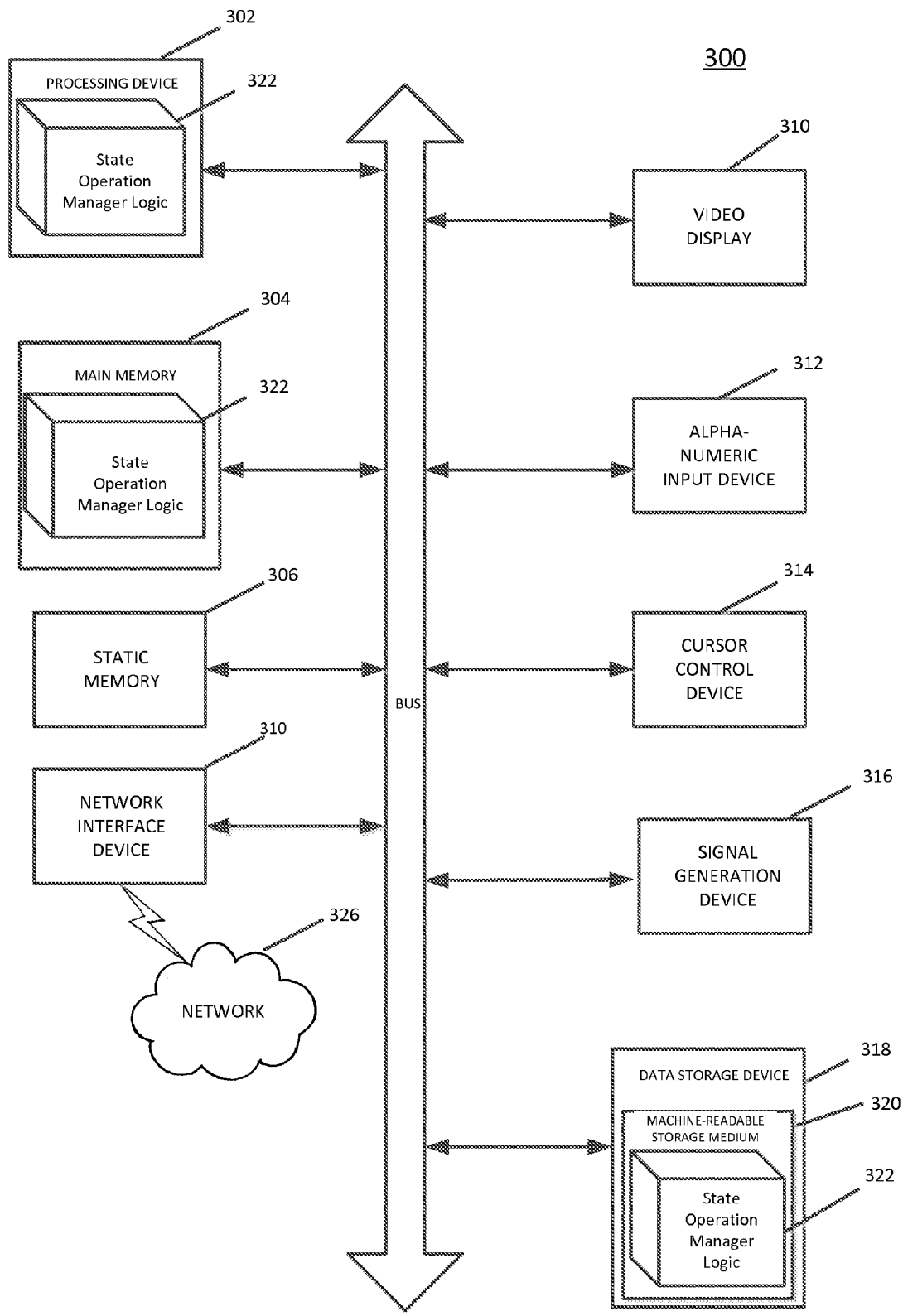
FIG. 3 illustrates a block diagram of one embodiment of a computer system.

FIG. 3 illustrates a diagrammatic representation of a machine in the example form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a memory 304 (e.g., read-only memory (ROM), flash memory, dynamic random access memory (DRAM) (such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute state operation manager logic 322 for performing the state operations and steps discussed herein. In one embodiment, state operation manger module 114 described with respect to FIG. 1B performs the state operation manager logic 322.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a machine-accessible storage medium (or more specifically a computer-readable storage medium) 320 on which is stored one or more sets of instructions (e.g. state operation manager logic 322) embodying any one or more of the methodologies of functions described herein, such as method 200 for managing states in application servers described with respect to FIGS. 2A, 2B and C. The state operation manager logic 322 may also reside, completely or at least partially, within the memory 306 and/or within the processing device 302 during execution thereof by the computer system 300; the memory 306 and the processing device 302 also constituting machine-accessible storage media. In one embodiment, state operation manager logic 322 is the same as state operation manager module 114 of FIG. 1B.

The machine-readable storage medium 320 may also be used to store the state operation manager processing logic 322 persistently containing methods that call the above applications. While the machine-readable storage medium 320 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions, which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "storing", "saving" "determining", "loading", "deleting" "selecting" "placing", or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   assigning, by a processing device, each of a plurality of configurations states with a time interval at which each of the plurality of configuration states are saved;
   sorting within the time interval, by the processing device, two or more configuration states among the plurality of configuration states of an application server into a group in view of a similarity of content in one of a file tuple or a database tuple between the plurality of configuration states, wherein each of the plurality of configuration states comprises settings of the application server;
   selecting, by the processing device, at a determined time occurring after the time interval, a first configuration state from the two or more configuration states in the group in view of a data quantity associated with one of the file tuple or the database tuple of the two or more configuration states in the group; and
   loading, by the processing device, the selected first configuration state into the application server.

2. The method of claim 1 wherein the selected first configuration state is the configuration state in the group comprising the data quantity larger than the data quantity of the two or more configuration states in the group.

3. The method of claim 1 further comprising receiving information associated with the first configuration state in the two or more configuration states in the group that is malfunctioned.

4. The method of claim 3 further comprising deleting the first malfunctioned configuration state in the plurality of configuration states and a second configuration state in the group in view of a match between the first malfunctioned configuration state and the second configuration state.

5. The method of claim 1 further comprising selecting a buffer to save the plurality of configuration states.

6. The method of claim 5 wherein the buffer is selected in view of the time interval assigned to each of the plurality of configuration states.

7. The method of claim 1 further comprising assigning an identifier to each of the plurality of configuration states.

8. A system comprising:
   a memory;
   a processing device operatively coupled to the memory to:
      assign each of a plurality of configurations states with a time interval at which each of the plurality of configuration states are saved;
      sort within the time interval two or more configuration states among the plurality of configuration states of an application server into a group in view of a similarity of content in one of a file tuple or a database tuple between the plurality of configuration states, wherein each of the plurality of configuration states comprises settings of the application server;
      select at a determined time occurring after the time interval, a first configuration state from the two or more configuration states in the group in view of a data quantity associated with one of the file tuple or the database tuple of the two or more configuration states in the group; and
      load the selected first configuration state into the application server.

9. The system of claim 8 wherein the selected first configuration state is the configuration state in the group comprising the data quantity larger than the data quantity of the two or more configuration states in the group.

10. The system of claim 8 the processing device to receive information associated with the first configuration state in the two or more configuration states in the group that is malfunctioned.

11. The system of claim 10 the processing device to delete the first malfunctioned configuration state in the plurality of configuration states and a second configuration state in the group in view of a match between the first malfunctioned configuration state and the second configuration state.

12. The system of claim 8 wherein the processing device is to select a buffer to save the plurality of configuration states.

13. The system of claim 12 wherein the buffer is selected in view of the time interval assigned to each of the plurality of configuration states.

14. The system of claim 8 wherein the processing device to assign an identifier to each of the plurality of configuration states.

15. A non-transitory machine-readable storage medium comprising data, when accessed by a processing device, cause the processing device to:

assign, by the processing device, each of a plurality of configurations states with a time interval at which each of the plurality of configuration states are saved;

sort within the time interval, by the processing device, two or more configuration states among the plurality of configuration states of an application server into a group in view of a similarity of content in one of a file tuple or a database tuple between the plurality of configuration states, wherein each of the plurality of configuration states comprises settings of the application server;

select, by the processing device, at a determined time occurring after the time interval, a first configuration state from the two or more configuration states in the group in view of a data quantity associated with one of the file tuple or the database tuple of the two or more configuration states in the group; and load, by the processing device, the selected first configuration state into the application server.

16. The non-transitory machine-readable storage medium of claim 15 wherein the selected first configuration state is the configuration state in the group comprising the data quantity larger than the data quantity of the two or more configuration states in the group.

17. The non-transitory machine-readable storage medium of claim 15 wherein the processing device is to receive information associated with the first configuration state in the two or more configuration states in the group that is malfunctioned.

18. The non-transitory machine-readable storage medium of claim 17 wherein the processing device is to delete the first malfunctioned configuration state in the plurality of configuration states and a second configuration state in the group in view of a match between the first malfunctioned configuration state and the second configuration state.

19. The non-transitory machine-readable storage medium of claim 15 wherein the processing device is to select a buffer to save the plurality of configuration states, wherein the buffer is selected in view of the time interval assigned to each of the plurality of configuration states.

20. The non-transitory machine-readable storage medium of claim 15 wherein the processing device to assign an identifier to each of the plurality of configuration states.

* * * * *